(12) United States Patent
Bookbinder et al.

(10) Patent No.: US 10,139,561 B2
(45) Date of Patent: Nov. 27, 2018

(54) LOW-LOSS AND LOW-BEND-LOSS OPTICAL FIBER

(71) Applicant: Corning Incorporated, Corning, NY (US)

(72) Inventors: Dana Craig Bookbinder, Corning, NY (US); Ming-Jun Li, Horseheads, NY (US); Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/759,648

(22) PCT Filed: Sep. 14, 2016

(86) PCT No.: PCT/US2016/051698
§ 371 (c)(1),
(2) Date: Mar. 13, 2018

(87) PCT Pub. No.: WO2017/048820
PCT Pub. Date: Mar. 23, 2017

(65) Prior Publication Data
US 2018/0252866 A1    Sep. 6, 2018

Related U.S. Application Data

(60) Provisional application No. 62/219,340, filed on Sep. 16, 2015.

(51) Int. Cl.
*G02B 6/028* (2006.01)
*G02B 6/036* (2006.01)
*G02B 6/02* (2006.01)

(52) U.S. Cl.
CPC ..... *G02B 6/03627* (2013.01); *G02B 6/02009* (2013.01); *G02B 6/0281* (2013.01)

(58) Field of Classification Search
CPC ............ G02B 6/03627; G02B 6/02009; G02B 6/0281
See application file for complete search history.

(56) References Cited

U.S. PATENT DOCUMENTS 4,114,980 A    9/1978  Asam et al.
4,306,776 A   12/1981  Someya
(Continued)

OTHER PUBLICATIONS

International Search Report and Written Opinion of the International Searching Authority; PCT/US2016051698 dated Dec. 1, 2016; 16 pages; European Patent Office.
(Continued)

*Primary Examiner* — Ellen Kim
(74) *Attorney, Agent, or Firm* — Svetlana Z. Short

(57) ABSTRACT

A single-mode fiber with low loss and low bend loss is disclosed. The fiber is single mode and has a central core (10), an inner cladding (20) and an outer cladding (30). The central core (10) has a radius $r_1$ and relative refractive index with a maximum value of $\Delta_{1max}$ and a core alpha greater than 1 and less than 10, and a $GeO_2$ dopant concentration of greater than 1 wt. % and less than or equal to 5 wt. %. The inner cladding (20) has an outer radius $r_2 > 9$ micrometers and a relative refractive index $\Delta_2$ where $\Delta_2$ is less then $-0.15\%$. The outer cladding (30) has a refractive index $\Delta_3$, wherein $\Delta_1 > \Delta_3 > \Delta_2$. The difference $\Delta_3 - \Delta_2 > 0.005\%$. The inner cladding includes fluorine having a concentration of greater than or equal to 0.5 wt. % and the outer cladding is updoped with respect to inner cladding.

22 Claims, 5 Drawing Sheets

(56) References Cited

U.S. PATENT DOCUMENTS

| | | | |
|---|---|---|---|
| 4,447,127 | A | 5/1984 | Cohen et al. |
| 4,641,917 | A | 2/1987 | Glodis et al. |
| 4,691,990 | A | 9/1987 | Cohen et al. |
| 4,838,643 | A | 6/1989 | Hodges et al. |
| 6,197,740 | B1 | 3/2001 | Shikata et al. |
| 6,205,279 | B1 | 3/2001 | Kim et al. |
| 7,526,169 | B2 | 4/2009 | Bickham et al. |
| 7,620,282 | B2 | 11/2009 | Bickham et al. |
| 7,623,747 | B2 | 11/2009 | De Montmorillon et al. |
| 7,676,129 | B1 | 3/2010 | Bookbinder et al. |
| 7,787,731 | B2 | 8/2010 | Bookbinder et al. |
| 7,889,960 | B2 | 2/2011 | De Montmorillon et al. |
| 7,903,917 | B2 | 3/2011 | Bickham et al. |
| 8,200,057 | B2 | 6/2012 | Han et al. |
| 8,542,969 | B2 | 9/2013 | Bookbinder et al. |
| 8,891,925 | B2 | 11/2014 | Bickham et al. |
| 8,953,917 | B2 | 2/2015 | Berkey et al. |
| 9,020,316 | B2 | 4/2015 | Bookbinder et al. |
| 2006/0029343 | A1* | 2/2006 | Farroni ............... G02B 6/024 385/123 |
| 2010/0027951 | A1 | 2/2010 | Bookbinder et al. |
| 2014/0185996 | A1 | 7/2014 | Zhang et al. |
| 2014/0241684 | A1 | 8/2014 | Bookbinder et al. |
| 2014/0301708 | A1 | 10/2014 | Mishra et al. |
| 2014/0369639 | A1 | 12/2014 | Zhang et al. |
| 2016/0011365 | A1 | 1/2016 | Berkey et al. |

OTHER PUBLICATIONS

Tajima et al.; "Viscosity-Matched P2O5-SiO2 Core Single-Mode Fiber", Optical Communications OFC 97, Feb. 16-21, 1997, pp. 4-5.

* cited by examiner

LOW-LOSS AND LOW-BEND-LOSS OPTICAL FIBER

This application is a national stage application under 35 U.S.C. § 371 of International Patent Application Serial No. PCT/US2016/51698, filed on Sep. 14, 2016, which claims the benefit of priority under 35 U.S.C. § 119 of U.S. Provisional Application Ser. No. 62/219340 filed on Sep. 16, 2015. The entire disclosure of any publication or patent document mentioned herein is incorporated by reference, including U.S. Patent Application Publication No. 2004/0240814, and U.S. Pat. Nos. 8,542,969; 8,891,925 and 9,020,316.

FIELD

The present disclosure relates to optical fibers, and in particular relates to a low-loss and low-bend-loss optical fiber.

BACKGROUND

Optical fibers are used in a variety of optical communications applications, including in so-called "access" and fiber to the premises (FTTx) optical networks. Unfortunately, optical fibers often need to be deployed in such networks in a manner that induces bend losses in optical signals transmitted through the optical fiber. Some circumstances and configurations that can result in tight bend radii, compression of optical fiber, and the like include deploying optical fiber in optical drop cable assemblies, deploying distribution cables with Factory Installed Termination Systems (FITS) and slack loops, small bend radius multi-ports located in cabinets that connect feeder and distribution cables, and jumpers in Network Access Points between distribution and drop cables.

Conventional single-mode optical fibers typically have an $SiO_2$ (silica) glass core region doped with a dopant suitable for raising the refractive index of the core region, with the core surrounded by a cladding glass of pure silica. A typical core region dopant is Ge (e.g., $GeO_2$). An index difference between the core and the cladding is necessary to create a light guide wherein propagating light is generally confined to the core region.

The concentration of $GeO_2$ found in a conventional single-mode doped-core optical fiber may be in excess of 7 weight percent (wt. %). Because the high concentration of dopant is located in the core region of the optical fiber, its attenuation is higher relative to pure silica glass. To overcome the light-absorbing characteristic of a core region containing relatively high concentrations of one or more dopants, pure silica core optical fibers were developed. That is, optical fibers having a core region composed of pure silica have been employed to avoid dopant-based attenuation.

To create the refractive index difference between the core and cladding in a pure silica core optical fiber, one or more refractive-index-modifying dopants are added to the cladding region to reduce the refractive index of the cladding region to a value below the refractive index of the pure silica core region. For example, fluorine (F) can be used as a dopant to decrease the refractive index of the silica glass cladding. The degree to which the refractive index of the cladding of a pure silica core optical fiber is decreased below the refractive index of the core depends upon the optical fiber design and the desired optical fiber parameters.

Doping the cladding region can also affect the viscosity of the cladding glass. That is, when a down-dopant such as F is added to a silica glass cladding region, the viscosity of the cladding region is lowered, resulting in a viscosity mismatch between the pure silica core glass and the doped silica cladding glass. The viscosity mismatch results in residual stress being retained in the fiber during the draw process, and this stress is one cause of transmission loss (attenuation).

To date it has proven difficult to design standards-compliant (e.g., the G.652 standard) optical fibers that have both low loss and low bend loss. The difficulty is due in part to Rayleigh scattering and small-angle scattering attributable to core dopants, the refractive index mismatches between cladding regions, and the viscosity mismatches between the core and cladding regions.

SUMMARY

An aspect of the disclosure is an optical fiber with low loss and low bend loss. The optical fiber is single-mode and includes: a central core region having a radius $r_1$ and relative refractive index with a maximum value of $\Delta_{1max}$ and a core alpha greater than 1 and less than 10, and a $GeO_2$ dopant concentration of greater than 1 wt. % and less than or equal to 5 wt. %; an inner cladding region immediately surrounding the central core region and having an outer radius $r_2 > 9$ microns and a relative refractive index $\Delta_2$ where $\Delta_2$ is less then $-0.15\%$; an outer cladding region immediately surrounding the inner cladding region and having a refractive index $\Delta_3$; wherein $\Delta_1 > \Delta_3 > \Delta_2$, and the wherein difference $\Delta_3 - \Delta_2 > 0.005\%$; and wherein the inner cladding includes fluorine having a concentration of greater than or equal to 0.5 wt. % and the outer cladding region is updoped with respect to inner cladding region.

Another aspect of the disclosure is the optical fiber disclosed above, wherein the central core region further comprises a second core segment having an alpha greater than or equal to 20.

Another aspect of the disclosure is the optical fiber disclosed above, wherein inner cladding region has a volume $V_2 > 5 \ \Delta \cdot \mu m^2$.

Another aspect of the disclosure is the optical fiber disclosed above, wherein inner cladding region has a volume $V_2 > 20 \ \Delta \cdot \mu m^2$.

Another aspect of the disclosure is the optical fiber disclosed above, wherein the difference $\Delta_3 - \Delta_2 > 0.015\%$.

Another aspect of the disclosure is the optical fiber disclosed above, wherein the difference $\Delta_3 - \Delta_2 > 0.025\%$.

Another aspect of the disclosure is the optical fiber disclosed above, wherein the optical fiber has an attenuation at a wavelength of 1550 nm of less than 0.175 dB/km.

Another aspect of the disclosure is the optical fiber disclosed above, wherein the optical fiber has an attenuation at a wavelength of 1550 nm of less than 0.175 dB/km.

Another aspect of the disclosure is the optical fiber disclosed above, wherein the optical fiber has a macrobend loss BL of 0.02 dB/turn ≤ BL ≤ 0.2 dB/turn for a 20 mm bend diameter and at a wavelength of 1550 nm.

Another aspect of the disclosure is the optical fiber disclosed above, wherein the optical fiber has a bend loss BL of 0.001 dB/turn ≤ BL ≤ 0.1 dB/turn for a 30 mm bend diameter and at a wavelength of 1550 nm.

Another aspect of the disclosure is the optical fiber disclosed above, wherein the optical fiber has a zero dispersion wavelength in the range 1300 nm ≤ zero dispersion wavelength ≤ 1324 nm.

Another aspect of the disclosure is the optical fiber disclosed above, wherein the optical fiber has a mode field diameter MFD at 1310 nm in the range 8.8 µm≤MFD≤9.6 µm.

Another aspect of the disclosure is the optical fiber disclosed above, wherein the optical fiber has a cable cut-off wavelength 22 meter cable cutoff≤1260 nm.

Another aspect of the disclosure is a single-mode optical fiber that has low loss and low bend loss. The optical fiber includes: a central core region having a radius $r_1$ and relative refractive index with a maximum value of $\Delta_1$ and a core alpha greater than 1 and less than 10, and a $P_2O_5$ dopant concentration of greater than 1 wt. % and less than or equal to 7 wt %; an inner cladding region immediately surrounding the central core region and having an outer radius $r_2 > 9$ microns and a relative refractive index $\Delta_2$ where $\Delta_2$ is less then −0.15%; an outer cladding region immediately surrounding the inner cladding region and having a refractive index $\Delta_3$; wherein $\Delta_1 > \Delta_3 > \Delta_2$, and the wherein difference $\Delta_3 - \Delta_2 > 0.005\%$; and wherein the inner cladding includes fluorine having a concentration of greater than or equal to 0.5 wt. % and the outer cladding region is updoped with respect to inner cladding region.

Another aspect of the disclosure is the optical fiber disclosed above, wherein the central core region, the inner cladding region and the outer cladding region define a mode-field diameter MFD at 1310 nm in the range 8.8 µm≤MFD≤9.6 µm at 1310 nm.

Another aspect of the disclosure is the optical fiber disclosed above, wherein the optical fiber has an attenuation at a wavelength of 1550 nm of less than 0.175 dB/km and a bend loss at 1550 nm for a 20 mm diameter mandrel of less than 0.5 dB/turn.

Another aspect of the disclosure is the optical fiber disclosed above, wherein inner cladding region has a volume $V_2 > 5 \, \Delta \cdot \mu m^2$.

Another aspect of the disclosure is the optical fiber disclosed above, wherein inner cladding region has a volume $V_2 > 20 \, \Delta \cdot \mu m^2$.

Another aspect of the disclosure is the optical fiber disclosed above, wherein the difference $\Delta_3 - \Delta_2 > 0.015\%$.

Another aspect of the disclosure is the optical fiber disclosed above, wherein the difference $\Delta_3 - \Delta_2 > 0.025\%$.

Another aspect of the disclosure is the optical fiber disclosed above, wherein the optical fiber has a bend loss of 0.02 dB/turn≤BL≤0.2 dB/turn at a 20 mm bend diameter and at wavelength of 1550 nm.

Another aspect of the disclosure is the optical fiber disclosed above, wherein the optical fiber has a bend loss BL if 0.001 dB/turn≤BL≤0.1 dB/turn for a 30 mm bend diameter and at a wavelength of 1550 nm.

Another aspect of the disclosure is the optical fiber disclosed above, wherein the optical fiber has a zero dispersion wavelength in the range 1300 nm≤zero dispersion wavelength≤1324 nm and a cable cut-off wavelength of ≤1260 nm.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Figure 1:
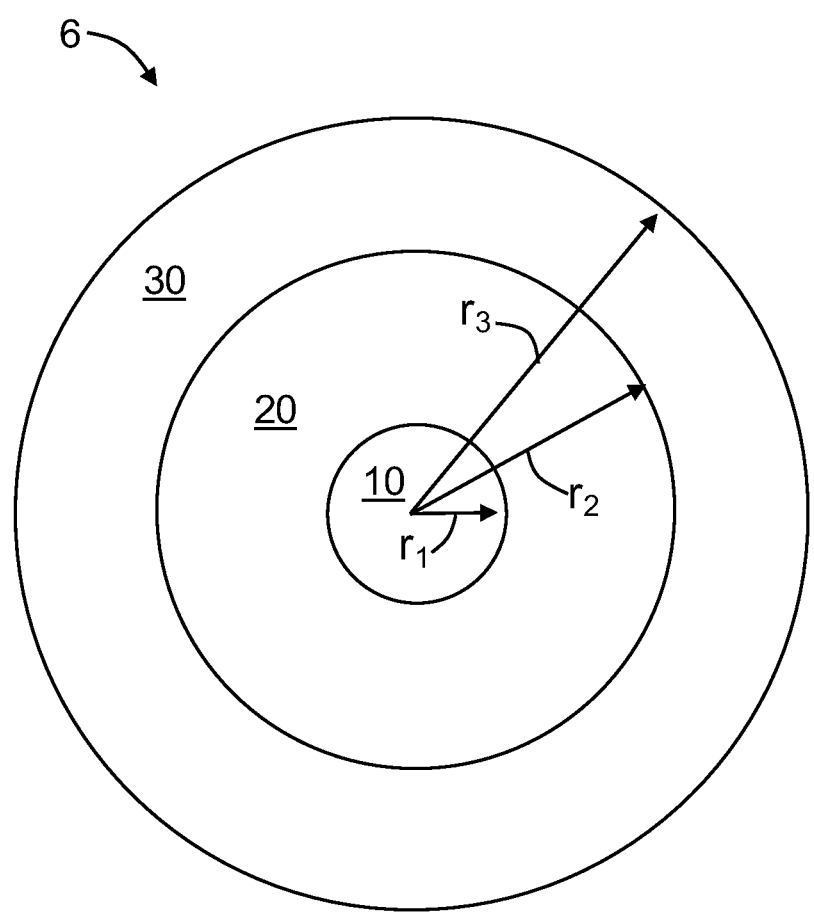
FIG. 1 is a cross-sectional view of an example low-loss and low-bend-loss optical fiber as disclosed herein.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Definitions and Terminology

The "refractive index profile" is the relationship between refractive index or relative refractive index and the fiber radius. The radius for each region or segment of the refractive index profile is given by the abbreviations $r_1$, $r_2$, $r_3$, $r_4$, etc. The refractive index for each region or segment is generally denoted using $n_1$, $n_2$, $n_3$, $n_4$, etc.

The "relative refractive index" (in %) is defined as $\Delta\% = 100 \times (n_i^2 - n_c^2)/2n_i^2$, and as used herein $n_c$ is the average refractive index of undoped silica. As used herein, the relative refractive index is represented by Δ and its values are given in units of "%", unless otherwise specified. The terms: delta, Δ, Δ%, %Δ, delta %, % delta and percent delta may be used interchangeability herein. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine (F) and boron (B).

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff}=2\pi(\int f^2 r\,dr)^2/(\int f^4 r\,dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" or "alpha profile" refers to a relative refractive index profile, expressed in terms of Δ(r) which is in units of "%", where r is radius, which follows the equation, $$\Delta(r)=\Delta(r_o)(1-[|r-r_o|/(r_1-r_o)]^\alpha),$$

where $r_o$ is the point at which Δ(r) is maximum, $r_1$ is the point at which Δ(r) % is zero, and r is in the range $r_i \le r \le r_f$, where Δ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2=(2\int f^2\,r\,dr/\int [df/dr]^2\,r\,dr)$, the integral limits being 0 to ∞.

The bend resistance of a waveguide fiber can be gauged by induced attenuation under prescribed test conditions, for example by deploying or wrapping the fiber around a mandrel of a prescribed diameter, e.g., by wrapping 1 turn around either a 6 mm, 10 mm, or 20 mm or similar diameter mandrel (e.g. "1×10 mm diameter macrobend loss" or the "1×20 mm diameter macrobend loss") and measuring the increase in attenuation per turn. The bend loss is measured in dB/turn unless otherwise indicated.

One type of bend test is the lateral load microbend test. In this so-called "lateral load" test (LLWM), a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200-1700 nm, e.g., 1310 nm or 1550 nm or 1625 nm).

Another type of bend test is the wire mesh covered drum microbend test (WMCD). In this test, a 400 mm diameter aluminum drum is wrapped with wire mesh. The mesh is wrapped tightly without stretching, and should have no holes, dips, or damage. Wire mesh material specification: McMaster-Carr Supply Company (Cleveland, Ohio), part number 85385T106, corrosion-resistant type 304 stainless steel woven wire cloth, mesh per linear inch: 165×165, wire diameter: 0.0019", width opening: 0.0041", open area %: 44.0. A prescribed length (750 meters) of waveguide fiber is wound at 1 m/s on the wire mesh drum at 0.050 centimeter take-up pitch while applying 80 (+/−1) grams tension. The ends of the prescribed length of fiber are taped to maintain tension and there are no fiber crossovers. The attenuation of the optical fiber is measured at a specified wavelength (typically within the range of 1200-1700 nm, e.g., 1310 nm or 1550 nm or 1625 nm); a reference attenuation is measured on the optical fiber wound on a smooth drum. The increase in attenuation is the wire mesh covered drum attenuation of the waveguide in dB/km at a specified wavelength (typically within the range of 1200-1700 nm, e.g., 1310 nm or 1550 nm or 1625 nm).

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface. The increase in attenuation is the pin array attenuation in dB of the waveguide at a specified wavelength (typically within the range of 1200-1700 nm, e.g., 1310 nm or 1550 nm or 1625 nm).

The theoretical fiber cutoff wavelength, or "theoretical fiber cutoff," or "theoretical cutoff," for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2m fiber cutoff test, FOTP-80 (EIA-TIA-455-80), to yield the "fiber cutoff wavelength", also known as the "2m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength," or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

The "moat volume" $V_2$ of inner cladding region 20, which is introduced and discussed below, is defined as:

$$V_2 = 2\int_{r1}^{r2} \Delta_{(2-1)}(r)r\,dr$$

where $r_1$ is the inner radius of the moat region of the refractive index profile, $r_2$ is the outer radius of the moat region of the refractive index profile, $\Delta_2(r)$ is the relative refractive index of the moat region of the refractive index profile, and r is radial position in the fiber. Moat volume $V_2$ is in absolute value and a positive quantity and can be expressed in units of %Δ micron$^2$, %Δ-micron$^2$, %Δ-μm$^2$, %Δμm$^2$, %μm$^2$ or Δ·μm$^2$, with the latter being used below.

Unless otherwise noted herein, optical properties (such as dispersion, dispersion slope, etc.) are reported for the LP01 mode.

Low-Loss and Low-Bend-Loss Optical Fiber

FIG. 1 is a cross-sectional view of an example low-loss and low-bend-loss optical fiber ("fiber") 6 as disclosed herein. The fiber radius is denoted generally as r. The fiber 6 has a central core region ("core") 10 of radius $r_1$ and a relative refractive index $\Delta_1(r)$, with the maximum value denoted as $\Delta_1$. The fiber 6 also includes an inner cladding region ("inner cladding") 20 that immediately surrounds core 10 and that has an (outer) radius $r_2$ and a relative refractive index $\Delta_2$. The fiber 6 also includes an outer cladding region ("outer cladding") 30 that immediately surrounds inner cladding 20 and that has an (outer) radius $r_3$ and a relative refractive index $\Delta_3$. The outer cladding 30 may include more than one section, such as shown in relative refractive index profile of FIG. 2D as sections 30A and 30B. The inner cladding 20 constitutes a "moat" as can be seen in the refractive index profiles of FIGS. 2A through 2F.

In an example, core 10 has a graded index defined by an alpha profile with an alpha value that in one example is in the range from 1 to 10, in another example is less than 5, in another example is less than 3 and in another example is less than 2.5. In an example, core 10 is doped with Ge with a Ge-dopant concentration of ≥1 to ≤5 wt %. In an example, core 10 contains no Ge dopants and is doped with P with a P-dopant concentration in the range from ≥1 wt. % to ≤7 wt. %. Optical fibers having low concentrations, (i.e., from ≥1 wt. % to ≤5 wt. %) of $GeO_2$, or (i.e., from ≥1 wt. % to ≤7 wt. %) $P_2O_5$ dopants in the core of can be readily manufactured using OVD, MCVD and PCVD processes and have yet very low attenuation due to the lower Rayleigh scattering.

In an example, inner cladding 20 is doped with F only, i.e., no other dopants besides F. In another example, the inner cladding has an F-dopant concentration in the range from 0.2 wt. % to 1.1 wt. %) and outer cladding 30 is also F-doped but at a lower concentration (e.g., in the range from 0 wt. % to 0.7 wt. %) than the inner cladding. Thus, in an example, outer cladding 30 is up-doped relative to inner cladding 20. In an example, $\Delta_1 > \Delta_3 > \Delta_2$, wherein the difference $\Delta_3 - \Delta_2$ in various example is $\Delta_3 - \Delta_2 > 0.005\%$ or $\Delta_3 - \Delta_2 > 0.015\%$ or $\Delta_3 - \Delta_2 > 0.025\%$.

In one example, the moat volume $V_2$ of inner cladding 20 is $V_2 > 5$ $\Delta \cdot \mu m^2$, while in another example, $V_2 > 20$ $\Delta \cdot \mu m^2$, while in yet another example $V_2 > 30$ $\Delta \cdot \mu m^2$.

In an example, fiber 6 exhibits at a wavelength of 1550 nm an attenuation that is less than 0.175 dB/km and meets the lower bend loss A2 requirement at a 20 mm bend diameter. In an example, the macrobend loss BL for a 20 mm mandrel diameter is less than 0.175 dB/turn or in another example is less than 0.1 dB/turn. In one example, 0.1 dB/turn≤BL≤1 dB/turn, while in another example, 0.02 dB/turn≤BL≤0.2 dB/turn for a 20 mm mandrel diameter (i.e., bend diameter).

In another example, the macrobend loss BL for a 30 mm mandrel diameter is less than 0.1 dB/turn. In one example, 0.001 dB/turn≤BL≤0.1 dB/turn, while in another example, 0.002 dB/turn≤BL≤0.02 dB/turn for a 30 mm mandrel diameter (i.e., bend diameter).

Table 1 below sets forth design parameters for six examples (EX1 through EX6) of fiber 6. In the Table, the 22 m cable cut-off wavelength, the zero-dispersion wavelength, and the macrobend loss.

TABLE 1

| Parameter | Ex. 1 | Ex. 2 | Ex. 3 | Ex. 4 | Ex. 5 | Ex. 6 |
|---|---|---|---|---|---|---|
| Δ1max (%) | 0.2 | 0.2 | 0.243 | 0.2 | 0.19 | 0.25 |
| Core dopant | GeO2 | GeO2 | GeO2 | GeO2 | GeO2 | GeO2 |
| R1 (micron) | 6.51 | 5.3 | 6.52 | 6.57 | 6.35 | 6.85 |
| Core Alpha | 2.2 | 2 | 2.2 | 2.2 | 2.2 | 1.5 |
| R2 (micron) | 30 | 24.5 | 25 | 30 | 15 | 17 |
| Inner cladding Δ2 (%) | −0.215 | −0.215 | −0.175 | −0.215 | −0.215 | −0.215 |
| Inner cladding dopant | F | F | F | F | F | F |
| Δ3A (%) | −0.16 | −0.165 | −0.12 | −0.16 | −0.185 | −0.17 |
| R3A (micron) | na | na | na | 50 | na | na |
| Δ3A cladding dopant | F | F | F | F | F | F |
| Δ3B (%) | −0.16 | −0.165 | −0.12 | 0 | −0.185 | −0.17 |
| Δ3B cladding dopant | F | F | F | none | F | F |
| R3 (micron) | 62.5 | 62.5 | 62.5 | 62.5 | 62.5 | 62.5 |
| V2 (Δ-μm²) | 47.2 | 28.6 | 32.0 | 47.1 | 5.5 | 10.9 |
| Dispersion at 1310 nm (ps/nm/km) | −0.111 | 0.573 | −0.056 | −0.02 | 0.485 | −0.015 |
| Dispersion Slope at 1310 nm (ps/nm^2/km) | 0.091 | 0.091 | 0.091 | 0.091 | 0.089 | 0.09 |
| Dispersion at 1550 nm (ps/nm/km) | 17.4 | 17.1 | 17.5 | 16.3 | 18.4 | 16.5 |
| Dispersion at Slope 1550 nm (ps/nm^2/km) | 0.062 | 0.062 | 0.061 | 0.06 | 0.059 | 0.061 |
| MFD at 1310 nm (micron) | 9.17 | 9.2 | 9.18 | 9.18 | 9.43 | 9.34 |
| MFD at 1550 nm (micron) | 10.45 | 10.48 | 10.46 | 10.47 | 10.63 | 10.54 |
| LLWM @ 1550 nm, dB/m | 0.36 | 0.58 | 0.27 | 0.36 | 0.56 | 0.41 |
| WMCD at 1550 nm, dB/km | 0.05 | 0.05 | 0.04 | 0.05 | 0.07 | 0.045 |
| Pin Array at 1550 nm, dB | 4.65 | 8.32 | 3.47 | 4.65 | 9.5 | 6.8 |
| Lambda 0 (nm) | 1313 | 1305 | 1313 | 1312 | 1308 | 1312 |
| 22 m Cable Cutoff (nm) | 1195 | 1195 | 1195 | 1195 | 1215 | 1220 |
| MAC # (MFD at 1310 nm/Cable Cutoff) | 7.67 | 7.70 | 7.68 | 7.68 | 7.76 | 7.66 |
| Macrobend Loss at 1550 nm, 20 mm diameter mandrel (dB/turn) | 0.064 | 0.062 | 0.064 | 0.065 | 0.200 | 0.170 |

TABLE 1-continued

| Parameter | Ex. 1 | Ex. 2 | Ex. 3 | Ex. 4 | Ex. 5 | Ex. 6 |
|---|---|---|---|---|---|---|
| Macrobend Loss at 1550 nm, 30 mm diameter mandrel (dB/turn) | 0.0045 | 0.0043 | 0.0045 | 0.0046 | 0.0060 | 0.0050 |
| Attenuation at 1550 nm, dB/km | 0.170 | 0.170 | 0.170 | 0.170 | 0.168 | 0.169 |
| Attenuation at 1310 nm, dB/km | 0.310 | 0.310 | 0.310 | 0.310 | 0.308 | 0.309 |

Figure 2A:
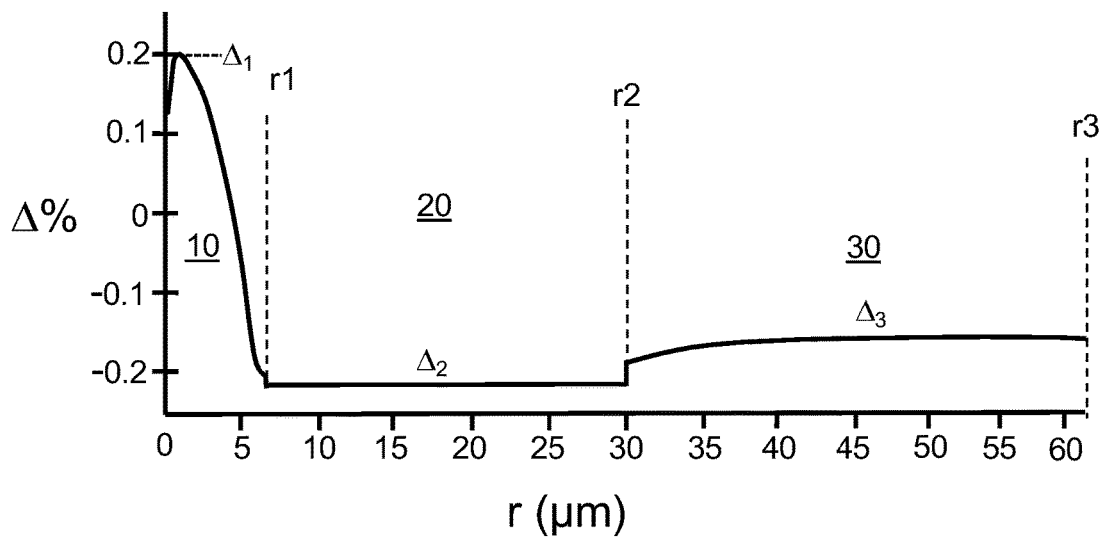
FIGS. 2A through 2H are plots of the relative refractive index Δ (%) versus the fiber radius r (µm) for eight example low-loss and low-bend-loss optical fibers as disclosed herein.
Figure 2B:
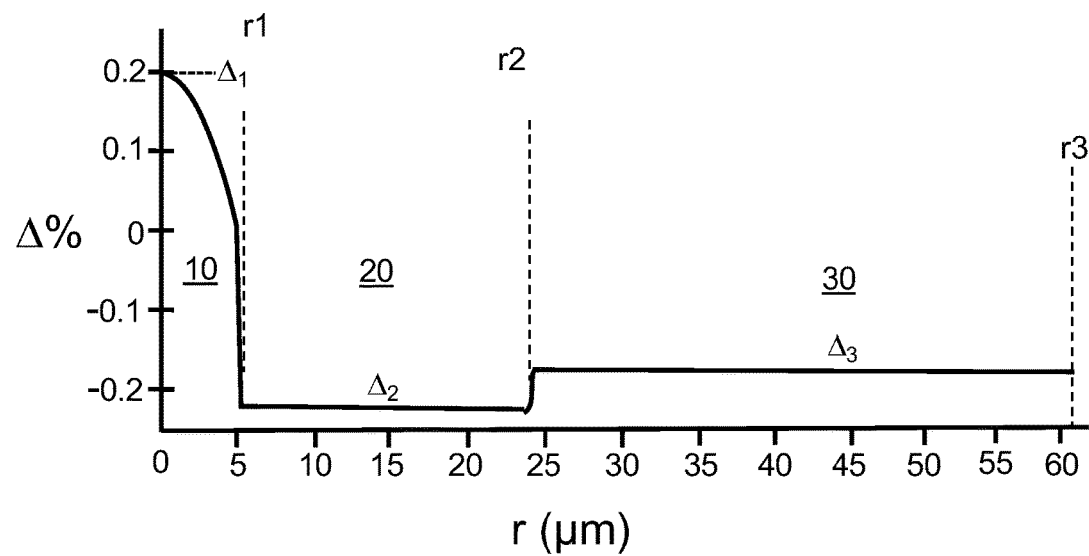
Figure 2C:
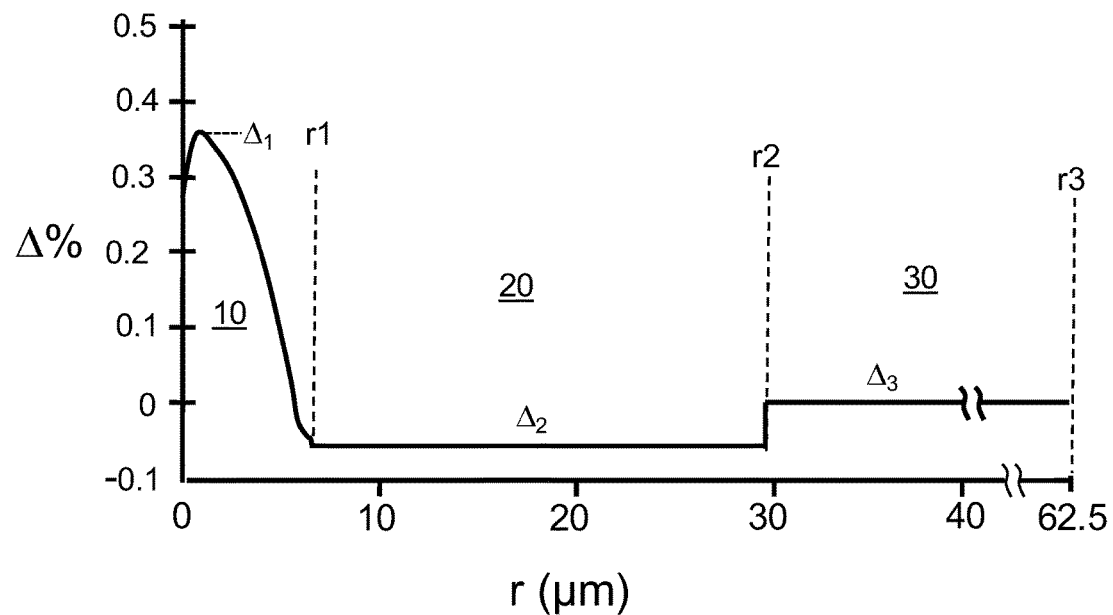
Figure 2D:
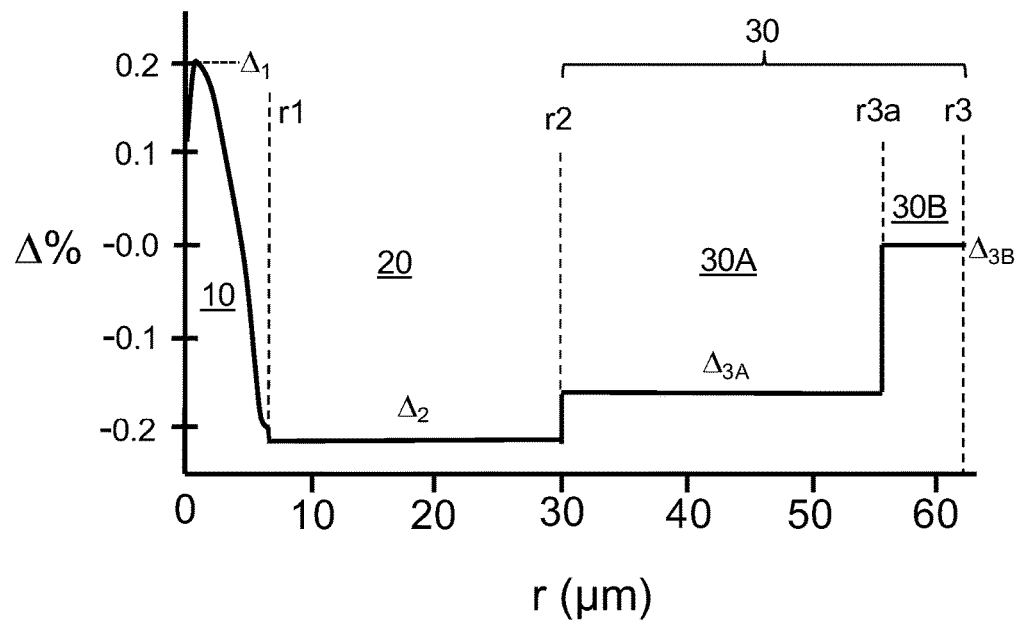
Figure 2E:
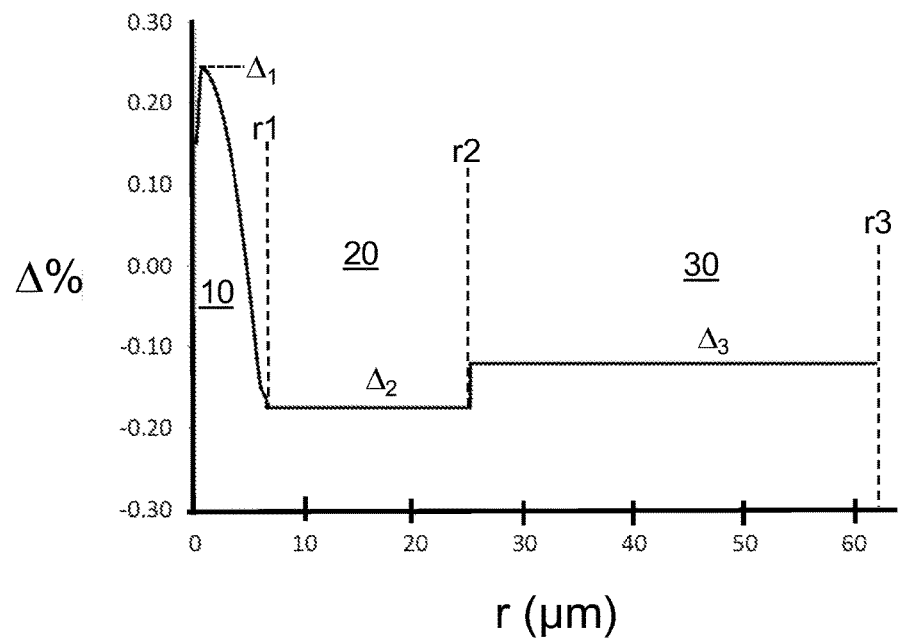
Figure 2F:
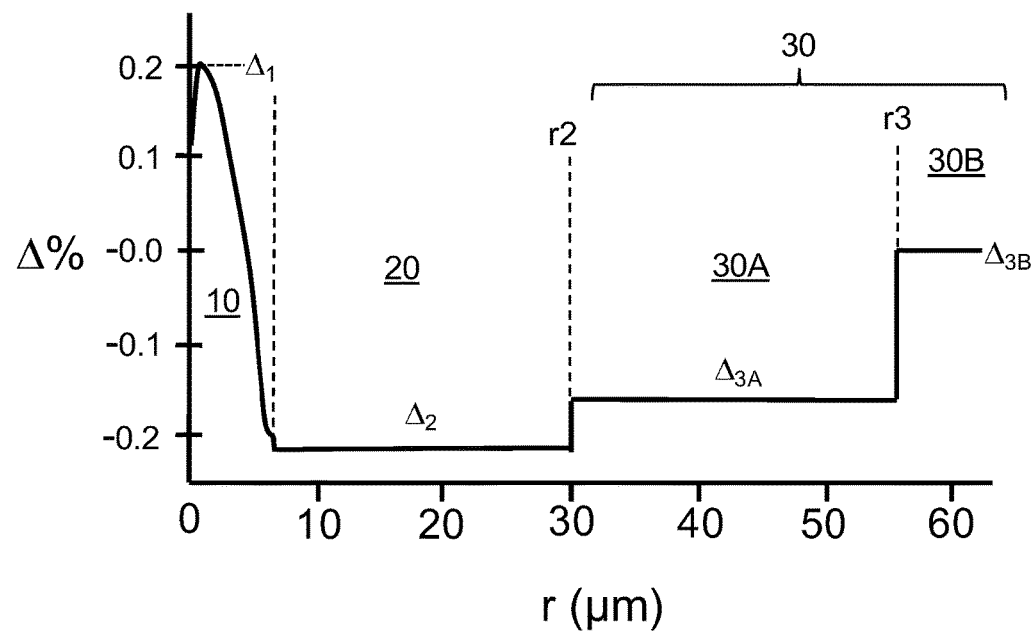
Figure 2G:
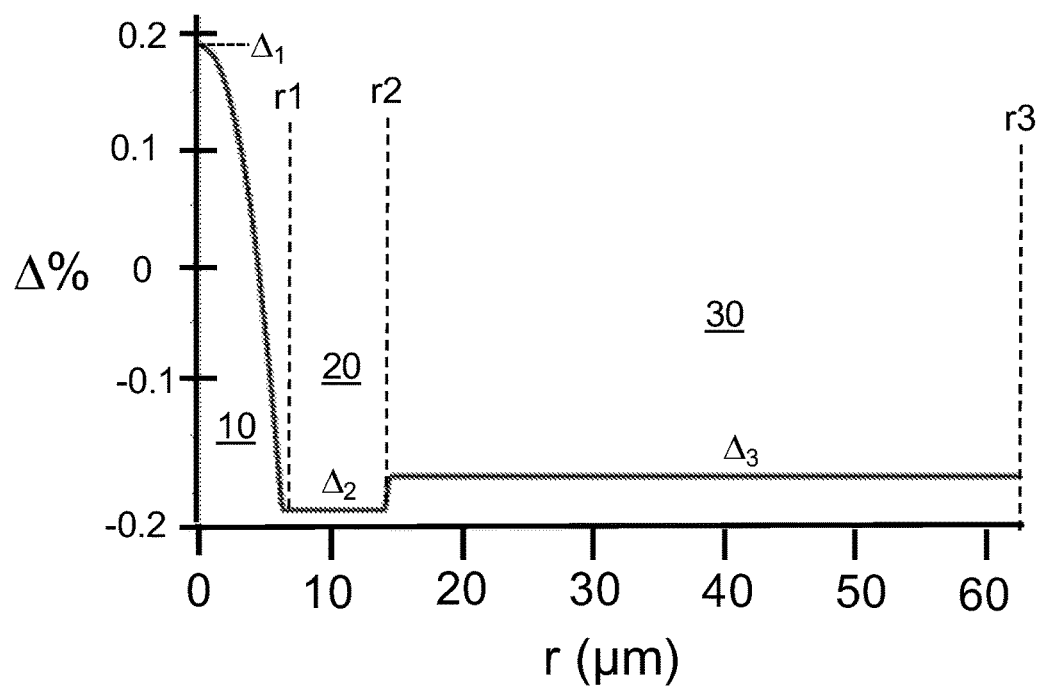
Figure 2H:
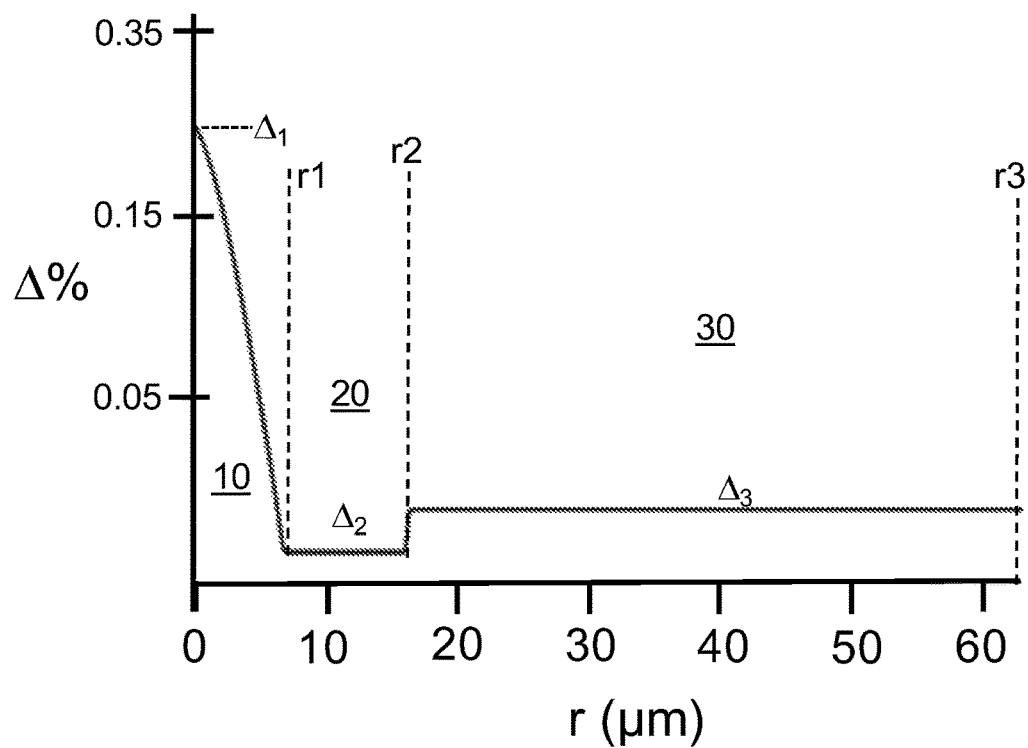

FIGS. 2A through 2H are plots of the relative refractive index Δ (%) versus the radius r, wherein FIGS. 2A through 2F are plots for the six example fibers EX1 through EX6 of Table 1. The relative refractive indices for the different fiber regions are indicated in the Figures. Note that FIG. 2D shows an example relative refractive index profile wherein the outer cladding 30 includes two sections 30A and 30B with respective relative refractive indices of $\Delta_{3A}$ and $\Delta_{3B}$, wherein $\Delta_{3A} < \Delta_{3B}$. The plots of FIGS. 2G and 2H are similar to the plot of FIG. 2E, and illustrate example fibers 6 having different-sized inner claddings 20 and outer claddings 30, as well as different core relative refractive indices Δ%.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A single-mode optical fiber comprising:
   a central core region having a radius $r_1$ and relative refractive index with a maximum value of $\Delta_{1max}$ and a core alpha greater than 1 and less than 10, and a $GeO_2$ dopant concentration of greater than 1 wt. % and less than or equal to 5 wt. %;
   an inner cladding region immediately surrounding the central core region and having an outer radius $r_2 > 9$ microns and a relative refractive index $\Delta_2$ where $\Delta_2$ is less than −0.15%;
   an outer cladding region immediately surrounding the inner cladding region and having a refractive index $\Delta_3$;
   wherein $\Delta_1 > \Delta_3 > \Delta_2$, and the wherein difference $\Delta_3 - \Delta_2 > 0.005\%$; and
   wherein the inner cladding includes fluorine having a concentration of greater than or equal to 0.5 wt. % and the outer cladding region is updoped with respect to inner cladding region.

2. The optical fiber according to claim 1, wherein the central core region includes a second core segment having an alpha greater than or equal to 20.

3. The optical fiber according to claim 1, wherein the inner cladding region has a volume $V_2 > 5$ Δ·μm².

4. The optical fiber according to claim 3, wherein the inner cladding region has a volume $V_2 > 20$ Δ·μm².

5. The optical fiber according to claim 1, wherein the difference $\Delta_3 - \Delta_2 > 0.015\%$.

6. The optical fiber according to claim 5, wherein the difference $\Delta_3 - \Delta_2 > 0.025\%$.

7. The optical fiber according to claim 1, wherein the optical fiber has an attenuation at a wavelength of 1550 nm of less than 0.175 dB/km.

8. The optical fiber according to claim 1, wherein the optical fiber has a macrobend loss BL of 0.02 dB/turn≤BL≤0.2 dB/turn for a 20 mm bend diameter at a 1550 nm wavelength.

9. The optical fiber according to claim 1, wherein the optical fiber has a macrobend loss BL of 0.001 dB/turn≤BL≤0.1 dB/turn for a 30 mm bend diameter at a 1550nm wavelength.

10. The optical fiber according to claim 1, wherein the optical fiber has a zero dispersion wavelength in the range 1300 nm≤zero dispersion wavelength≤1324 nm.

11. The optical fiber according to claim 1, wherein the optical fiber has a mode field diameter MFD at 1310 nm in the range 8.8 μm≤MFD≤9.6 μm.

12. The optical fiber according to claim 1, wherein the optical fiber has a cable cut-off wavelength 22 meter cable cutoff≤1260 nm.

13. A single-mode optical fiber comprising:
   a central core region having a radius $r_i$ and relative refractive index with a maximum value of $\Delta_1$ and a core alpha greater than 1 and less than 10, and a $P_2O_5$ dopant concentration of greater than 1 wt. % and less than or equal to 7 wt %;
   an inner cladding region immediately surrounding the central core region and having an outer radius $r_2 > 9$ microns and a relative refractive index $\Delta_2$ where $\Delta_2$ is less than −0.15%;
   an outer cladding region immediately surrounding the inner cladding region and having a refractive index $\Delta_3$;
   wherein $\Delta_1 > \Delta_3 > \Delta_2$, and the wherein difference $\Delta_3 - \Delta_2 > 0.005\%$; and
   wherein the inner cladding includes fluorine having a concentration of greater than or equal to 0.5 wt. % and the outer cladding region is updoped with respect to inner cladding region.

14. The optical fiber according to claim 13, wherein the central core region, the inner cladding region and the outer cladding region define a mode-field diameter MFD at 1310 nm in the range 8.8 μm≤MFD≤9.6 μm.

15. The optical fiber according to claim 14, wherein the optical fiber has an attenuation at a wavelength of 1550 nm of less than 0.175 dB/km and a bend loss at 1550 nm for a 20 mm diameter mandrel of less than 0.5 dB/turn.

16. The optical fiber according to claim 14, wherein the inner cladding region has a volume $V_2 > 5$ Δ·μm².

17. The optical fiber according to claim 16, wherein the inner cladding region has a volume $V_2 > 20$ Δ·μm².

18. The optical fiber according to claim 14, wherein the difference $\Delta_3 - \Delta_2 > 0.015\%$.

19. The optical fiber according to claim 18, wherein the difference $\Delta_3 - \Delta_2 > 0.025\%$.

20. The optical fiber according to claim 14, wherein the optical fiber has a bend loss BL of 0.02 dB/turn≤BL≤0.2 dB/turn for a 20 mm bend diameter at a 1550 nm wavelength.

21. The optical fiber according to claim 14, wherein the optical fiber has a bend loss of 0.001 dB/turn≤BL≤0.1 dB/turn for a 30 mm bend diameter and at a 1550 nm wavelength.

22. The optical fiber according to claim 14, wherein the optical fiber has a zero dispersion wavelength in the range 1300 nm≤zero dispersion wavelength≤1324 nm, and a cable cut-off wavelength of ≤1260 nm.

* * * * *

UNITED STATES PATENT AND TRADEMARK OFFICE
CERTIFICATE OF CORRECTION

PATENT NO. : 10,139,561 B2
APPLICATION NO. : 15/759648
DATED : November 27, 2018
INVENTOR(S) : Dana Craig Bookbinder et al.

It is certified that error appears in the above-identified patent and that said Letters Patent is hereby corrected as shown below:

On the Title Page

In Column 2, item (57), Abstract, Line 6, delete "GeO$_2$" and insert -- GeO$_2$ --, therefor.

In Column 2, item (57), Abstract, Line 9, delete "then" and insert -- than --, therefor.

In the Claims

In Column 9, Line 48, Claim 1, delete "the wherein" and insert -- wherein the --, therefor.

In Column 10, Line 20, Claim 9, delete "1550nm" and insert -- 1550 nm --, therefor.

In Column 10, Line 31, Claim 13, delete "r$_i$" and insert -- r$_1$ --, therefor.

In Column 10, Line 42, Claim 13, delete "the wherein" and insert -- wherein the --, therefor.

Signed and Sealed this
Fourth Day of October, 2022

Katherine Kelly Vidal
*Director of the United States Patent and Trademark Office*